(12) United States Patent
Hong et al.

(10) Patent No.: US 11,486,728 B1
(45) Date of Patent: Nov. 1, 2022

(54) ELECTRONIC APPARATUS AND OPERATION METHOD THEREOF

(71) Applicant: Coupang Corp., Seoul (KR)

(72) Inventors: Sang Gi Hong, Seoul (KR); Kun Soo Han, Seoul (KR); Hye Jin Park, Seoul (KR); Hye Jin Oh, Seoul (KR); Yeo Joo Yang, Seoul (KR); Seon Il Kim, Seoul (KR); Hyun Hee Ahn, Seoul (KR); Jung Yeon Nam, Seoul (KR); Chun Kwon Park, Seoul (KR); Jin Hyeong Park, Seoul (KR); Yong Sik Kim, Seoul (KR); Liangwei He, Seoul (KR); Qingqing Bai, Seoul (KR); Ji Young Park, Seoul (KR); Hae Yeon Lee, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/565,132

(22) Filed: Dec. 29, 2021

(30) Foreign Application Priority Data

Jul. 30, 2021 (KR) ........................ 10-2021-0101002

(51) Int. Cl.
*G01C 21/00* (2006.01)
*G06F 3/0488* (2022.01)
*G06F 3/04845* (2022.01)

(52) U.S. Cl.
CPC ...... *G01C 21/3859* (2020.08); *G01C 21/3811* (2020.08); *G06F 3/0488* (2013.01); *G06F 3/04845* (2013.01)

(58) Field of Classification Search
CPC .............. G01C 21/3859; G08G 5/0021; G06F 3/04845; G06F 16/29; G06F 3/0488; G06F 3/0421; G06F 3/041; G06F 3/0481; G06Q 10/083; G06Q 50/30
See application file for complete search history.

(56) References Cited

U.S. PATENT DOCUMENTS

| 9,459,775 | B2 * | 10/2016 | Kuscher | G06F 3/0488 |
| 2015/0112886 | A1 | 4/2015 | Luan et al. | |
| 2016/0068264 | A1 * | 3/2016 | Ganesh | G06Q 10/083 701/4 |
| 2019/0066516 | A1 * | 2/2019 | Kuhara | G06Q 50/30 |

(Continued)

FOREIGN PATENT DOCUMENTS

| CN | 102750028 A | * | 10/2012 | ............. G06F 3/041 |
| CN | 106156280 A | * | 11/2016 | ............. G06F 16/29 |
| CN | 107025015 A | * | 8/2017 | ........... G06F 3/0416 |

(Continued)

OTHER PUBLICATIONS

Rostan, Brittany A. "Change an Uber Pickup Location after Ordering: Here's How" SlashGear. Mar. 30, 2017. pp. 1-2, <https://www.slashgear.com/change-an-uber-pickup-location-after-ordering-heres-how-30480375/>.

*Primary Examiner* — Yuri Kan

(74) *Attorney, Agent, or Firm* — Banner & Witcoff, Ltd.

(57) ABSTRACT

Disclosed is a method of operating an electronic apparatus, the method including identifying first position information on a map based on address information input by a user requesting a delivery service, identifying second position information corrected from the first position information on the map, updating information by matching the address information and the second position information on the map, and providing the updated information.

16 Claims, 16 Drawing Sheets

(56) References Cited

U.S. PATENT DOCUMENTS

2019/0332235 A1* 10/2019 Miyoshi .............. G06F 3/04845
2021/0174301 A1* 6/2021 Abeywardena ...... G08G 5/0021

FOREIGN PATENT DOCUMENTS

| | | | |
|---|---|---|---|
| JP | 2002-123599 A | 4/2002 | |
| JP | 2004-227267 A | 8/2004 | |
| KR | 1020090117911 A | 11/2009 | |
| KR | 101235210 B1 * | 2/2013 | ........... G06F 3/0481 |
| KR | 1020130038102 A | 4/2013 | |
| KR | 1020140041665 A | 4/2014 | |
| KR | 1020150018637 A | 2/2015 | |
| KR | 1020160098887 A | 8/2016 | |
| KR | 101933073 B1 | 12/2018 | |
| KR | 102097763 B1 | 4/2020 | |
| WO | 2019088742 A1 | 5/2019 | |

* cited by examiner

US 11,486,728 B1

ELECTRONIC APPARATUS AND OPERATION METHOD THEREOF

RELATED APPLICATION INFORMATION

The present application claims priority to and the benefit of Korean Patent Application No. 10-2021-0101002, filed on Jul. 30, 2021, and is incorporated by reference herein in its entirety.

TECHNICAL FIELD

The present disclosure relates to an electronic apparatus for smoothly providing a delivery service by correcting position information on a map in association with a delivery address and an operation method thereof.

DESCRIPTION OF THE RELATED ART

Using an application, a user may apply for a food delivery service and a deliverer may provide the food delivery service based on a delivery address input by the user. Position information corresponding to a text-based delivery address input by the user may be represented on a map so as to be provided along with the text-based delivery address to the deliverer. When the position information on the map does not exactly match the text-based delivery address, the inconsistency may confuse the deliverer so that the deliverer may fail to quickly provide the food delivery service. In other words, due to the inconsistency between the text-based delivery address and the position information on the map, the delivery may be delayed in a process of providing the food delivery service. In terms of the food delivery service, quick delivery is an important competitive factor. Thus, if the delivery is delayed, user's satisfaction may decrease, which may lead to a decrease in sales. Accordingly, there is a desire for technology to efficiently provide relevant information by correcting position information on a map such that the position information matches a text-based delivery address.

Disclosure of the Invention

Technical Goals

An aspect provides an electronic apparatus and an operation method thereof. The goals to be achieved by example embodiments of the present disclosure are not limited to the objectives described above and other objects may be inferred from the following example embodiments.

Technical Solutions

According to an aspect, there is provided a method of operating an electronic apparatus, the method including identifying first position information on a map based on address information input by a user requesting a delivery service, identifying second position information corrected from the first position information on the map, updating information by matching the address information and the second position information on the map, and providing the updated information.

The second position information may correspond to a position corrected in an area determined according to a predetermined category level based on the first position information on the map and a position corrected in an area based on an address corresponding to a lowest level of the predetermined category level.

The second position information may correspond to a position corrected within a predetermined distance based on the first position information on the map.

The input address information may be parsed based on a predetermined category level in association with an address.

The predetermined distance may correspond to a distance set in advance based on a predetermined category level corresponding to the input address information.

The predetermined distance may be set to increase in response to the predetermined category level increasing and set to decrease in response to the predetermined category level decreasing.

The providing of the updated information may include providing the address information and the second position information to a deliverer terminal.

The providing of the address information and the second position information may include providing navigation information based on the address information and the second position information together to the deliverer terminal.

The providing to the deliverer terminal may include additionally providing image information corresponding to the second position information to the deliverer terminal.

The method may further include displaying a screen for requesting detailed information associated with the address information parsed based on the predetermined category level in association with the address.

The second position information may be prevented from being corrected to a position farther from the predetermined distance based on the first position information on the map.

The predetermined distance may be represented as an area on the map, the area in which the first position information is movable on the map by the user.

The first position information may be identified in response to a text-based input for an address. The second position information may be corrected in response to a touch input of the user on the map on which the first position information is displayed.

According to another aspect, there is also provided an electronic apparatus including a communication device and a processor configured to identify first position information on a map based on address information input by a user requesting a delivery service, identify second position information corrected from the first position information on the map, and update information by matching the address information and the second position information on the map.

According to still another aspect, there is also provided a non-transitory computer-readable recording medium including a computer program for performing the above-described method.

Details of other example embodiments are included in the following detailed description and the accompanying drawings.

Effects

According to the present disclosure, when a delivery address that is text information input by a user does not match first position information represented on a map based on the delivery address, corrected second position information and the delivery address may be matched such that accurate information associated with a delivery service is provided to a deliverer. At this time, navigation information based on the second position information may be provided so that the deliverer provides the delivery service to the exact address without confusion. A range in which the first position information can be modified on the map may be limited based on the text information input by the user, and the first position information may be modified in the corresponding range. In addition, a delivery availability may be verified by setting a position different from a current location identified through a user terminal. When the delivery service is not available at the corresponding position, a related list may be provided by searching for delivery-available regions nearby. Effects of the present disclosure are not limited to those described above and other effects may be made apparent to those skilled in the art from the following description.

DETAILED DESCRIPTION FOR CARRYING OUT THE INVENTION

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may indicate the following meaning including: A alone; B alone; C alone; both A and B together; both A and C together; both B and C together; or all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

Figure 1:
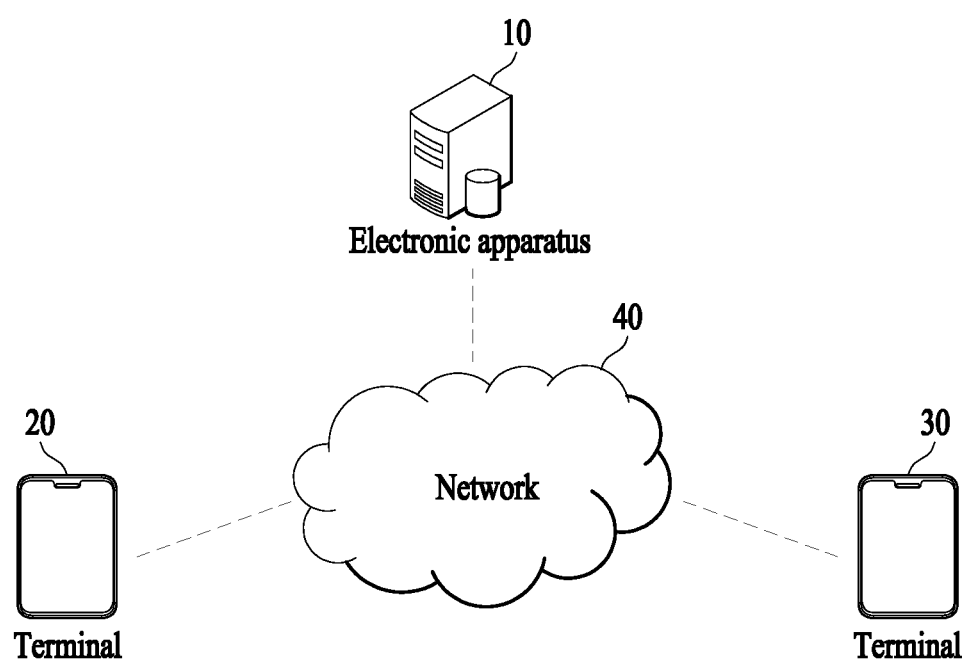
FIG. 1 illustrates a system according to an example embodiment.

FIG. 1 illustrates a system according to an example embodiment.

Referring to FIG. 1, a system may include an electronic apparatus 10, a terminal 20, a terminal 30, and a network 40. FIG. 1 illustrates only components of the system related to the present embodiment. However, it is obvious to those skilled in the art that other general-purpose components may be further included in addition to the components illustrated in FIG. 1.

The electronic apparatus 10, the terminal 20, and the terminal 30 may communicate with each other in the network 40. The network 40 may include any one or combinations of a local area network (LAN), a wide area network (WAN), a value added network (VAN), a mobile radio communication network, and a satellite communications network. Also, the network is a comprehensive data communication network that allows network components of FIG. 1 to smoothly communicate with each other, and may include a wired Internet, a wireless Internet, and a mobile wireless communication network. The wireless communication may be, for example, wireless fidelity (Wi-Fi) LAN, Bluetooth™, Bluetooth low energy, ZigBee, Wi-Fi direct (WFD), ultra wideband (UWB), infrared Data Association (IrDA) communication, and near field communication (NFC), but is not limited thereto.

The electronic apparatus 10 may provide all information associated with delivery to provide a delivery service and be included in a server that provides information associated with delivery.

At this time, the terminal 20 may correspond to a terminal used by a user to request a delivery service. The terminal 30 may correspond to a terminal used by a deliverer who provides a delivery service. Specifically, when the user requests the delivery service using the terminal 20, the electronic apparatus 10 may transmit relevant information to the terminal 30 corresponding to a suitable deliverer among a plurality of deliverers. The deliverer may provide the delivery service to the user based on the information displayed on the terminal 30.

The user may correct position information associated with a delivery address using the terminal 20. The electronic apparatus 10 may provide the corrected position information to the terminal 30 such that the delivery is to be processed smoothly. Hereinafter, a process performed by the electronic apparatus 10 will be described in greater detail.

Figure 2:
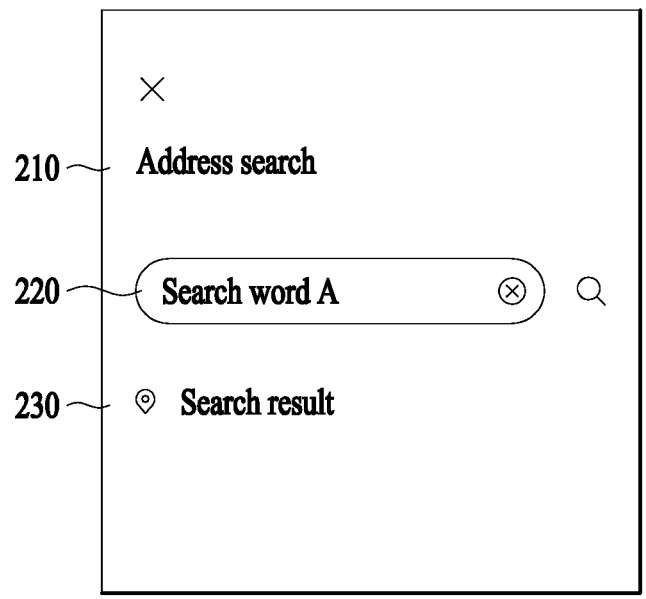
FIG. 2 is a diagram illustrating a screen for inputting text-based address information in a terminal used by a user according to an example embodiment.

FIG. 2 is a diagram illustrating a screen for inputting text-based address information in a terminal used by a user according to an example embodiment.

Referring to FIG. 2, to request a delivery service, a user may input information associated with address information through a terminal. Here, the delivery service may be a food delivery service. For example, when the user requests the delivery service for pizza sold in a store A, an electronic apparatus may provide relevant information to a suitable deliverer among a plurality of deliverers around the store A so that the deliverer picks up the pizza at the store A and delivers the pizza to the user. Such food delivery service is a service that is to be conducted within a relatively short period of time, for example, one hour from when the user places an order. Thus, the electronic apparatus needs to provide optimal information related to the delivery to the deliverer.

In a process of requesting the food delivery service through an application, the user may input a plurality of pieces of information using a terminal. Specifically, to request the food delivery service, the user may input information associated with a delivery address through an application provided by the electronic apparatus. A screen of FIG. 2 is a screen for an address search 210 performed in association with the delivery address. The user may search with a search word A 220 corresponding to the delivery address, and a search result may be displayed in an area 230 of the application. For example, the user may input the search word A corresponding to the delivery address to which the food delivery service is to be provided, and the electronic apparatus may display a search result for the search word A in the area 230 of the application.

Figure 3:
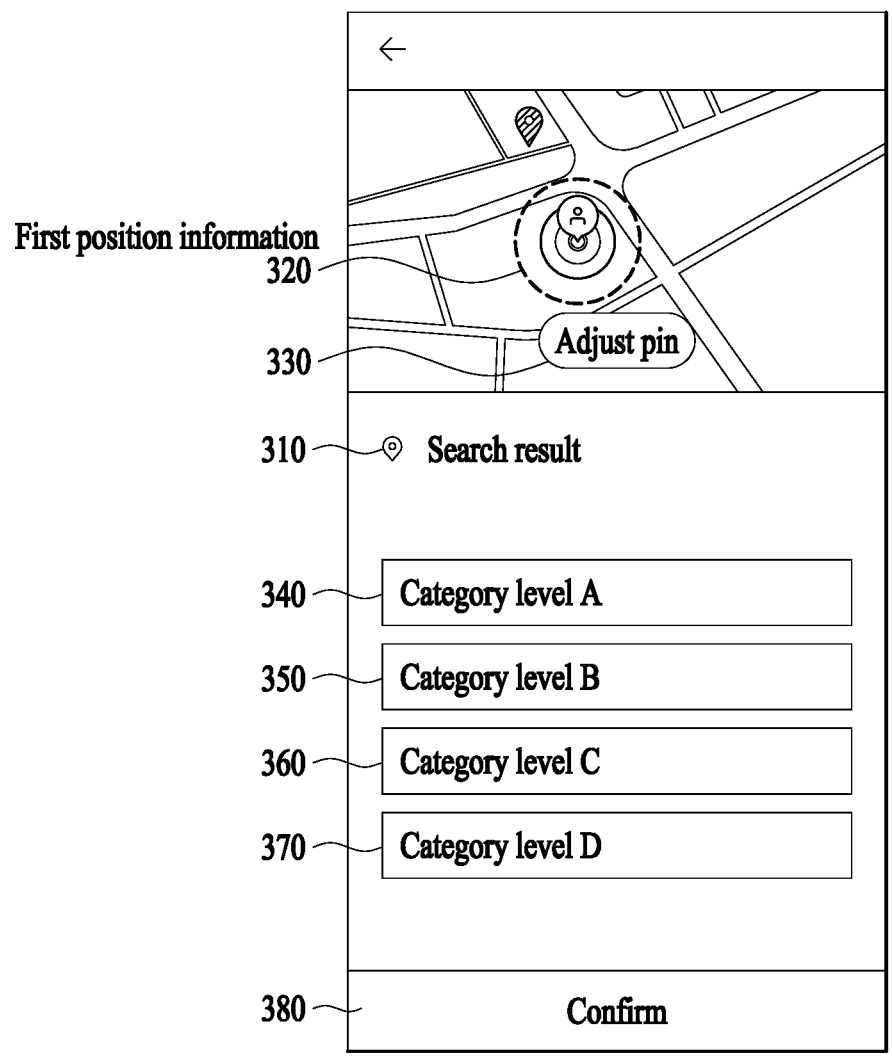
FIG. 3 is a diagram illustrating first position information represented on a map based on text-based address information input by a user according to an example embodiment.
Figure 4:
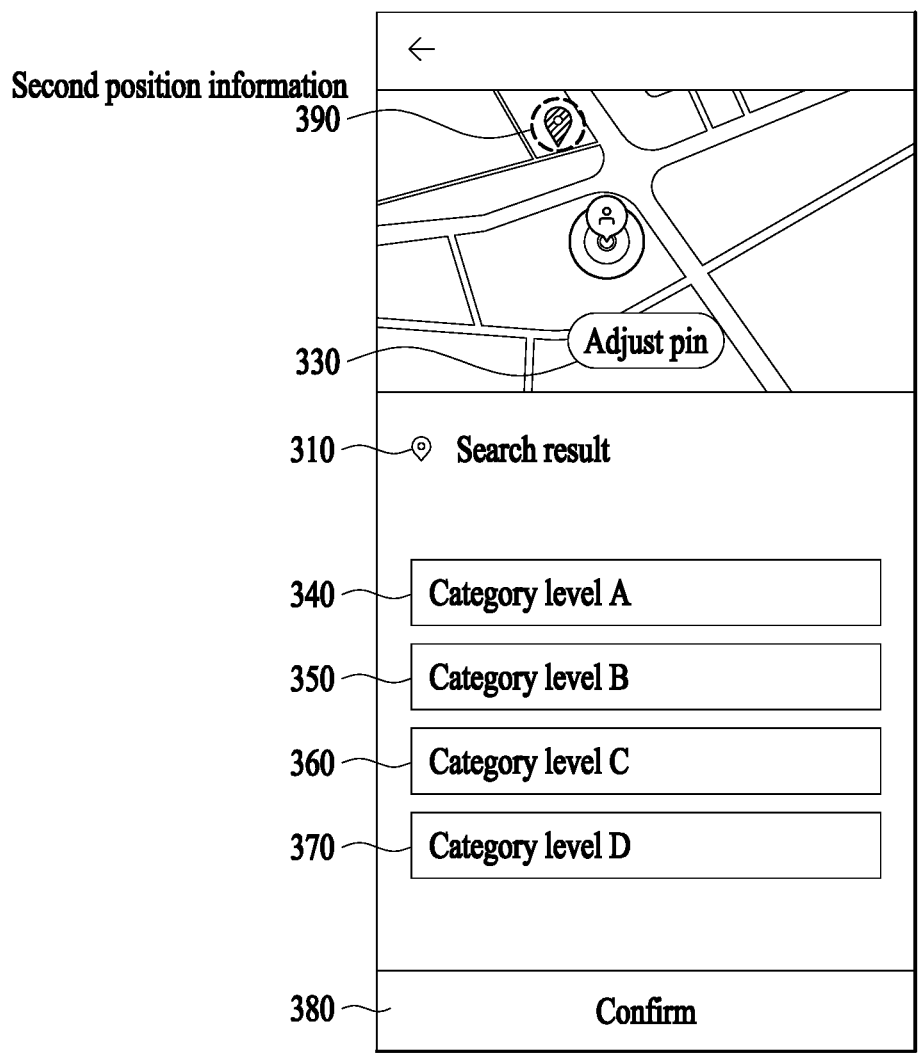
FIG. 4 is a diagram illustrating second position information corrected from the first position information represented on the map according to an example embodiment.

FIG. 3 is a diagram illustrating first position information represented on a map based on text-based address information input by a user according to an example embodiment, and FIG. 4 is a diagram illustrating second position information corrected from the first position information represented on the map according to an example embodiment.

When a user selects the area 230 on the screen of FIG. 2, a screen of FIG. 3 may be displayed through an application. Referring to FIG. 3, a search result corresponding to a search word A may be displayed in an area 310 like the area 230, and first position information 320 corresponding to the search result may be displayed on a map. In this instance, the search result displayed in the area 310 to correspond to the search word A input by the user may be text information, and the first position information 320 may be position information viewed by representing the search result corresponding to the text information on the map. That is, the first position information 320 may be position information corresponding to a search result on a map.

The electronic apparatus may parse the search result corresponding to the search word A, which is address information input by the user, based on a predetermined category level. The address information may be displayed according to a predetermined rule, and the electronic apparatus may analyze the corresponding rule and parse the search word A corresponding to the address information based on the predetermined category level. For example, address information in the Republic of Korea may be expressed as an administrative unit 1/an administrative unit 2/an administrative unit 3/ . . . /an administrative unit N according to a predetermined rule, and the electronic apparatus may analyze the predetermined rule and parse the address information based on a unit constituting the address. Here, the predetermined category level may correspond to the administrative unit 1, the administrative unit 2, the administrative unit 3, and the like.

In this instance, the electronic apparatus may previously set a category level of address information required in association with delivery. As an example, the electronic apparatus may classify a category level of address information required minimally in relation to the delivery, into X levels (for example, four levels). In this example, in response to address information including a category level of at least X levels being identified, the deliverer may smoothly provide the delivery service. Also, the electronic apparatus may previously set a category level of address information required maximally in relation to the delivery, into Y levels (for example, seven levels). When address information including a category level of up to Y levels is identified, the deliverer may smoothly provide the delivery service.

When the search result corresponding to the search word A is parsed based on the predetermined category level, the electronic apparatus may compare the search result to a minimum category level set in advance. For example, when the search result corresponding to the search word A is parsed based on a category level of three levels according to the predetermined category level, the electronic apparatus may additionally require address information corresponding to a category level A of level one to satisfy the minimum category level. The electronic apparatus may identify a category level corresponding to address information additionally input by the user through an area 340, an area 350, an area 360, and an area 370. When the additionally identified information satisfies the minimum category level, an area 380 may be activated. When the user selects a confirm icon through the area 380, the electronic apparatus may provide relevant information to the deliverer.

When the search result corresponding to the search word A is parsed based on the predetermined category level, the electronic apparatus may compare the search result to a maximum category level set in advance. For example, when the search result corresponding to the search word A is parsed based on a category level of three levels according to the predetermined category level, the electronic apparatus may additionally require address information corresponding to a category level of four levels to provide more specific information to the deliverer. The electronic apparatus may identify a category level corresponding to address information additionally input by the user through the area 340, the area 350, the area 360, and the area 370. Even if the search result does not satisfy the maximum category level, once the minimum category level is satisfied, the electronic apparatus may activate the area 380. The user may additionally input address information corresponding to the category level A of level one to satisfy the minimum category level. However, even if address information corresponding to category levels B through D of the remaining three levels for satisfying the maximum category level is not input, the delivery may be processed. As such, the minimum category level may be essential for processing the delivery while the maximum category level is an option for providing more specific information to the deliverer.

When the user selects an icon "Adjust pin" of an area 330, the user may correct the first position information 320 on the map. Due to various errors, text-based address information corresponding to the search result 310 may not match the first position information 320 on the map. In this case, the deliverer may not smoothly provide the delivery service. To solve this, the user may select the icon "Adjust pin" of the area 330 to correct the first position information 320 automatically displayed on the map according to the search result 310. In addition, to smoothly provide the delivery service, more detailed information than the first position information 320 represented on the map according to the text-based address information may be provided. In this instance, the user may select the icon "Adjust pin" of the area 330 to correct the first position information 320 automatically represented on the map according to the search result 310.

FIG. 4 illustrates second position information corrected from the first position information 320 in response to the user selecting the icon "Adjust pin." Position information on the map matching the search result 310 corresponding to text information may not be the first position information 320 but the second position information 390. At this time, the electronic apparatus may provide, to the deliverer, navigation information based on the second position information 390 instead of the first position information 320. Through this, an inconsistency between the text information and the position information on the map may be solved, so that the delivery smoothly provides the delivery service.

Figure 5:
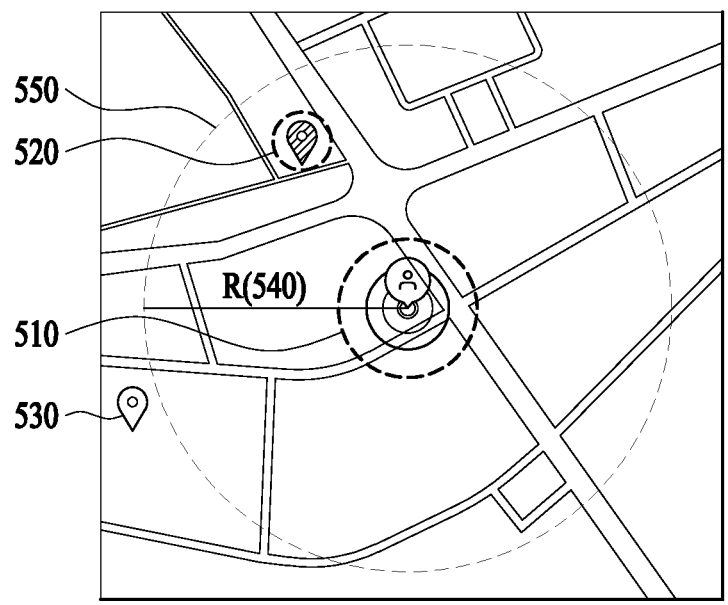
FIG. 5 is a diagram illustrating a reference applied when first position information is corrected to second position information according to an example embodiment.

FIG. 5 is a diagram illustrating a reference applied when first position information is corrected to second position information according to an example embodiment.

Referring to FIG. 5, first position information 510 may be corrected to one of second position information 520 or second position information 530. At this time, instead of the second position information 530, the user may correct the first position information 510 to the second position information 520 in an area 550 corresponding to a predetermined distance R 540 from the first position information 510.

According to the example embodiment, the second position information 520 corrected from the first position information 510 may be located within the predetermined distance R 540 from the first position information 510 on the map. The user may correct the first position information 510 in a range of the area 550 corresponding to the predetermined distance R 540 and may not correct the first position information 510 to a range out of the area 550. Even if the address information corresponding to the text information does not match the first position information 510, an error range due to the mismatching is not significantly large, so the predetermined distance R 540 may be set in consideration of the error range. If the first position information 510 is corrected to be out of the area 550, the electronic apparatus may determine that the corrected position has an error range due to inconsistency with the address information corresponding to the text information and thus, may not allow the correction of the first position information 510.

At this time, the predetermined distance R 540 may correspond to a distance set in advance based on the predetermined category level corresponding to the input address information. The text information corresponding to the address information input by the user may be parsed based on the predetermined category level. For example, the text information corresponding to the address information input by the user may be divided into units indicating the address, such as the administrative unit 1/the administrative unit 2/the administrative unit 3. In this example, the predetermined category level may be set to correspond to each of the administrative units. Specifically, the predetermined category level 1 may correspond to the administrative unit 1, the predetermined category level 2 may correspond to the administrative unit 2, and the predetermined category level 3 may correspond to the administrative unit 3. A unit may indicate a more specific address in an ascending order from the administrative unit 1 to the administrative unit N. For example, an area covered by the administrative unit 1 may correspond to an upper unit compared to an area covered by the administrative unit 3. Here, the administrative unit 2 may be a unit representing one region among a plurality of regions included in the administrative unit 1, and the administrative unit 3 may be a unit representing one region among a plurality of regions included in the administrative unit 2.

A predetermined distance R corresponding to the predetermined category level 1 related to the administrative unit 1 may be relatively long compared to a predetermined distance R corresponding to the predetermined category level 3 related to the administrative unit 3. Since the administrative units cover different sizes of areas, the predetermined distance R may be set in advance by applying a size of the corresponding area. For example, when a category level increases from the predetermined category level 1 to the predetermined category level 3, the predetermined distance R displayed on the map may also increase. Conversely, when a category level decreases from the predetermined category level 1 to the predetermined category level 3, the predetermined distance R displayed on the map may decrease.

When the text information input by the user is parsed based on the predetermined category level, the electronic apparatus may display, on the map, an area corresponding to a predetermined distance R corresponding to a lowest level among the predetermined category levels. For example, when the text information input by the user is parsed into the administrative unit 1, the administrative unit 2, and the administrative unit 3, the electronic apparatus may identify a predetermined distance R corresponding to the administrative unit 3 which is the lowest level, and may display an area corresponding to the predetermined distance R on the map. When the user corrects the first position information 510 to the second position information 520 within an area corresponding to the predetermined distance R, the electronic apparatus may update information by matching the address information corresponding to the text information and the second position information 520. In this instance, the electronic apparatus may provide navigation information to a deliverer terminal based on the second position information 520 instead of the first position information 510. The deliverer may smoothly provide the delivery service to the second position information 520 instead of the first position information 510 based on the navigation information provided to the terminal. Relevant information provided to the deliverer terminal will be described in greater detail with reference to FIG. 6.

Figure 6:
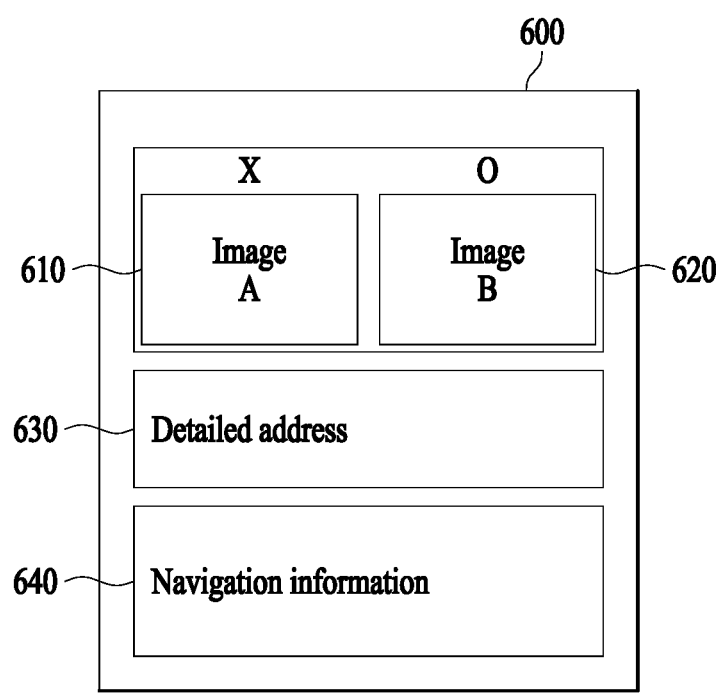
FIG. 6 is a diagram illustrating relevant information provided to a deliverer terminal according to an example embodiment.

FIG. 6 is a diagram illustrating relevant information provided to a deliverer terminal according to an example embodiment.

Referring to FIG. 6, a screen 600 showing delivery-related information may be displayed on a deliverer terminal. An image A 610 may be an image corresponding to first position information and, specifically, an image provided to a deliverer such that the deliverer easily identifies the first position information. An image B 620 may be an image corresponding to second position information and, specifically, an image provided to the deliverer such that the deliverer easily identifies the second position information. The image A 610 corresponding to the first position information may be provided to the deliverer terminal along with the image B 620 corresponding to the second position information, so that the deliverer may provide a delivery service to an accurate address without misunderstanding a delivery address.

In addition, a detailed address 630 may be displayed together on the screen 600. The detailed address 630 may include address information corresponding to a search result related to the search word A of FIG. 2 used for the search by the user. Also, the detailed address 630 may further include address information corresponding to category levels A through D additionally input by the user as described with reference to FIGS. 3 and 4.

Also, navigation information 640 may be additionally displayed on the screen 600. The navigation information 640 may be information guiding the second position information instead of the first position information. The deliverer may provide the delivery service to an accurate delivery address using the navigation information 640 displayed on the terminal.

Figure 7:
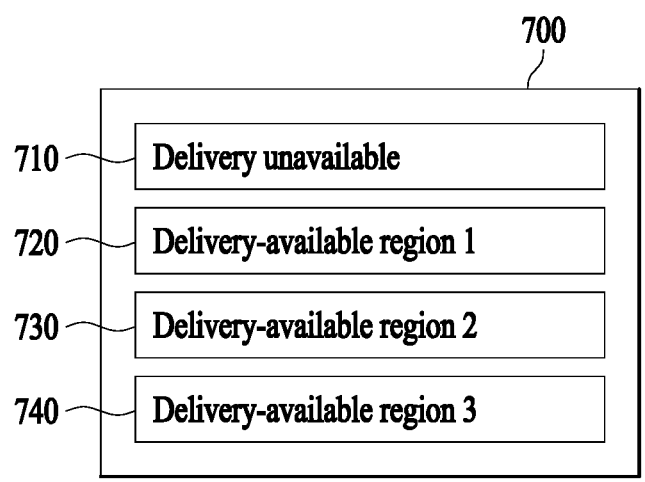
FIG. 7 illustrates a screen displayed on a user terminal according to an example embodiment.

FIG. 7 illustrates a screen displayed on a user terminal according to an example embodiment.

In the examples of FIGS. 3 and 4, when a user selects the confirm icon in the area 380, delivery to the corresponding position may be unavailable. In this case, a user terminal may display a screen 700 as illustrated in FIG. 7. As such, a food delivery service may not be provided to a certain region. In such cases, the user terminal may display the screen 700 showing information associated with delivery unavailable 710 to the corresponding position. Alternatively, a delivery availability may be verified by setting a position different from a current location identified through the user terminal. If the delivery service is unavailable at the corresponding position, the information associated with the delivery unavailable 710 may be displayed on the screen 700.

When delivery to a position selected by the user is unavailable, the electronic apparatus may retrieve a delivery-available region and display relevant information on the screen 700. At this time, the electronic apparatus may retrieve a delivery-available region at a lowest category level by analyzing address information that is text information input by the user, and display regions on the screen 700 in an order of closeness. For example, the electronic apparatus may retrieve a delivery-available region nearby by changing the administrative unit 3 that is the lowest category level among the administrative unit 1, the administrative unit 2, and the administrative unit 3, which are the address information input by the user. In this example, on the screen 700, the electronic apparatus may display delivery-available regions same in the administrative unit 1 and the administrative unit 2 and different in the administrative unit 3 in an order of closeness to the address information input by the user. Specifically, address information corresponding to a delivery-available region 1 720 may be the administrative unit 1/the administrative unit 2/an administrative unit 3a. Address information corresponding to a delivery-available region 2 730 may be the administrative unit 1/the administrative unit 2/an administrative unit 3b. Address information corresponding to a delivery-available region 3 740 may be the administrative unit 1/the administrative unit 2/an administrative unit 3c. Here, the administrative units 3a, 3b, and 3c may be adjacent regions retrieved by changing the administrative unit 3 to which the delivery is unavailable, and displayed on the screen 700 in an order of adjacency.

When no delivery-available region nearby is found at the lowest category level, the electronic apparatus may retrieve a delivery-available region nearby at a next lowest category level. For example, when the delivery is unavailable, the electronic apparatus may retrieve delivery-available regions of which the administrative unit 3 is different. In this example, when there is no delivery-available region among the regions of which the administrative unit 3 is changed, the electronic apparatus may retrieve delivery-available regions of which the administrative unit 2 that is the next lowest category level is different. Specifically, address information corresponding to the delivery-available region 1 720 may be the administrative unit 1/an administrative unit 2a. Address information corresponding to the delivery-available region 2 730 may be the administrative unit 1/an administrative unit 2b. Address information corresponding to the delivery-available region 3 740 may be the administrative unit 1/an administrative unit 2c. Here, the administrative units 2a, 2b, and 2c may be adjacent regions retrieved by changing the administrative unit 2 and displayed on the screen 700 in an order of adjacency.

Figure 8:
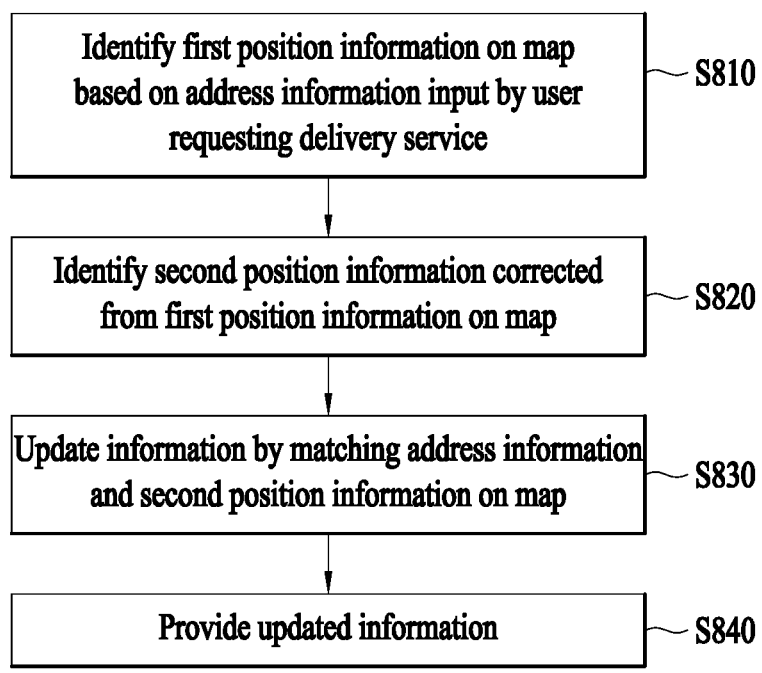
FIG. 8 is a flowchart illustrating an operation method of an electronic apparatus according to an example embodiment.

FIG. 8 is a flowchart illustrating an operation method of an electronic apparatus according to an example embodiment.

Referring to FIG. 8, in operation S810, an electronic apparatus may identify first position information on a map based on address information input by a user requesting a delivery service. Here, the first position information may be position information identified in response to a text-based input for an address input by the user. In this instance, the input address information may be parsed based on a predetermined category level in association with an address.

In operation S820, the electronic apparatus may identify second position information corrected from the first position information on the map. Here, the second position information may be position information corrected based on a touch input of the user on the map on which the first position information is displayed.

According to the example embodiment, the second position information may correspond to a position corrected in an area determined according to a predetermined category level based on the first position information on the map, and a position corrected in an area based on an address corresponding to a lowest level of the predetermined category level. For example, when the address information input by the user is parsed into category levels 1 through 3, the second position information may correspond to a position corrected within an area in consideration of an administrative unit corresponding to the category level 3 that is the lowest level. In this example, an area corresponding to the category level 1 may include a relatively large area compared to the area corresponding to the category level 3.

Alternatively, the second position information may correspond to a position corrected within a predetermined distance set in consideration of a predetermined category level based on the first position information on the map. In this instance, the second position information may be prevented from being corrected to a position farther from the predetermined distance based on the first position information on the map. For example, when the address information input by the user is parsed based on the category levels 1 through 3, the second position information may correspond to a position corrected within a predetermined distance in consideration of the administrative unit corresponding to the category level 3 that is the lowest level. In this example, a predetermined distance corresponding to the category level 1 may include a relatively long distance compared to the predetermined distance corresponding to the category level 3. Here, the predetermined distance may be displayed on the map as an area in which the first position information can be moved on the map.

In operation S830, the electronic apparatus may update information by matching the address information and the second position information on the map. The electronic apparatus may match the address information corresponding to text information and the second position information instead of the first position information and update a result of the matching.

In operation S840, the electronic apparatus may provide the updated information to a deliverer terminal. Specifically, the electronic apparatus may provide the second position information and the address information corresponding to the text information to the deliverer terminal. At this time, the electronic apparatus may additionally provide navigation information based on the second position information. In addition, to avoid misunderstanding of a delivery address, the electronic apparatus may provide, to the deliverer terminal, image information corresponding to the first position information and image information corresponding to the second position information together.

The user may request delivery with the corrected second position information, and then pay a fee to the delivery service using a payment option stored in advance. The user may store the payment option in the electronic apparatus in advance by inputting information associated with the payment option and use the stored payment option. In this instance, without needing to upload image information obtained by capturing the corresponding payment option to the electronic apparatus, the user may input and use relevant information (for example, a unique serial number, expiration date information, etc.) for identifying the payment option.

Figure 9:
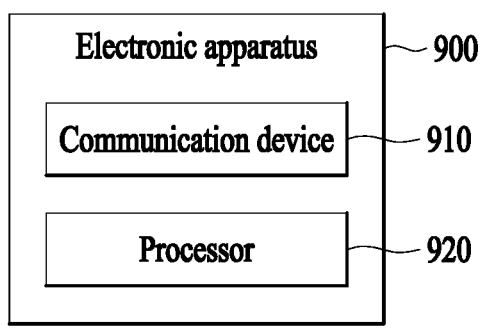
FIG. 9 is a block diagram illustrating an electronic apparatus according to an example embodiment.

FIG. 9 is a block diagram illustrating an electronic apparatus according to an example embodiment.

According to an example embodiment, an electronic apparatus 900 may include a communication device 910 and a processor 920. FIG. 9 illustrates components of the electronic apparatus 900 related to the present embodiment only. Accordingly, it can be understood by those of ordinary skill in the art related to the present embodiment that other general-purpose components may be further included in addition to the components shown in FIG. 9. Since the electronic apparatus 900 may include features related to the aforementioned electronic apparatuses, descriptions of duplicated contents will be omitted.

The communication device 910 may transmit and receive information associated with delivery.

The processor 920 may control the overall operations of the electronic apparatus 900 and may process data and signals. The processor 920 may be configured with at least one hardware unit. Also, the processor 920 may operate by one or more software modules generated by executing program codes stored in the memory. The processor 920 may execute program codes stored in the memory to control overall operations of the electronic apparatus 900 and process data and signals. In addition, in the example embodiment, the processor 920 may include at least one processor.

The processor 920 may identify first position information on a map based on address information input by a user requesting a delivery service. In addition, the processor 920 may identify second position information corrected from the first position information on the map and match the second position information and the address information. Also, the processor 920 may update a matching result and provide updated information to a deliverer terminal so that the delivery service is smoothly processed.

Figure 10:
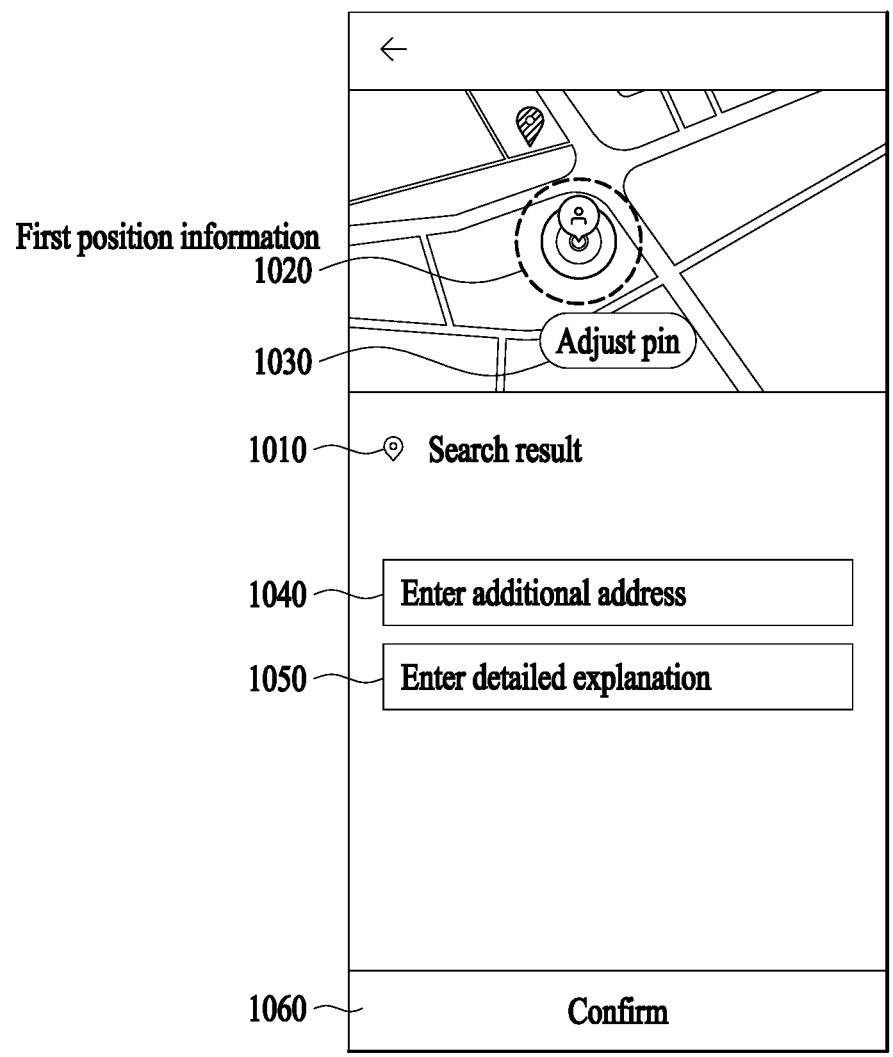
FIG. 10 is a diagram illustrating a process of inputting an additional address and a detailed explanation to a screen according to an example embodiment.
Figure 11:
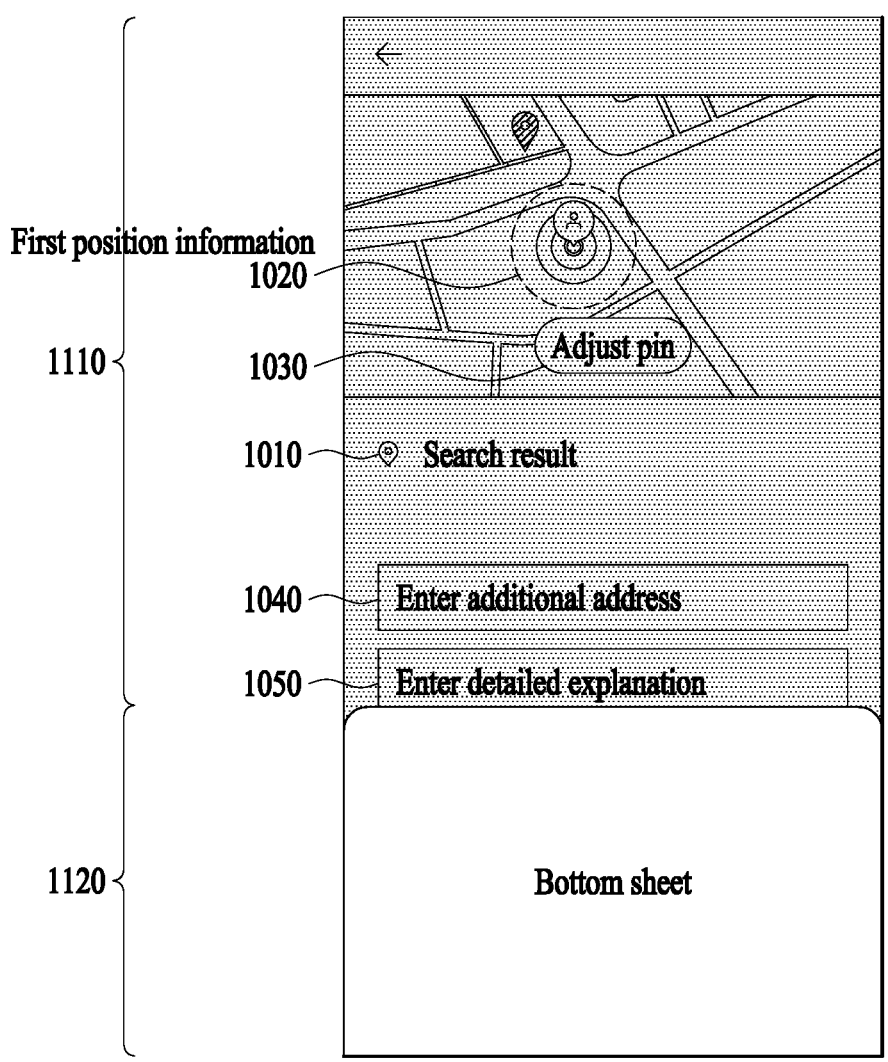
FIG. 11 is a diagram illustrating a bottom sheet displayed to request the additional address and the detailed explanation according to an example embodiment.

FIG. 10 is a diagram illustrating a process of inputting an additional address and a detailed explanation to a screen according to an example embodiment. FIG. 11 is a diagram illustrating a bottom sheet displayed to request the additional address and the detailed explanation according to an example embodiment.

Referring to FIG. 10, address information corresponding to a search word input by a user may be displayed in a partial area on a screen as a search result 1010, and a first position information 1020 corresponding to the search result on the map and an adjust pin 1030 for adjustment thereof may be displayed in a partial area on the screen.

At this time, more detailed additional information of the address information displayed in the search result 1010 may be input to an area 1040 by a user such that a deliverer smoothly performs delivery. Specifically, when the search result 1010 corresponds to a delivery address, an additional address may correspond to information for assisting in identifying the delivery address (e.g., a building name). For example, when an address of a building A corresponding to a search result is displayed in the search result 1010 and a name of the building A is "Samsung building", the user may input the building name "Samsung building" as an additional address. The deliverer may perform the delivery using the delivery information shown in the search result 1010. Also, the delivery may intuitively recognize the delivery address by identifying the name of the building shown in the additional address and perform the delivery with increased efficiency.

In addition, the user may input, to an area 1050, detailed explanation to assist the deliverer in smoothly providing the delivery service. Based on the detailed explanation input by the user, the deliverer may easily find the delivery address and provide the delivery service. The detailed explanation is an explanation corresponding to features for identifying the delivery address and may include, for example, an explanation about an appearance of the building. For example, to identify the building A, the user may input "a three-floor building with green doors." Through this, the deliverer may easily find the building A corresponding to "a three-floor building with green doors" in the corresponding delivery address.

When the user selects a confirm icon 1060 without inputting the additional address or detailed explanation, a bottom sheet may be displayed in a lower portion of a screen as shown in FIG. 11.

Referring to FIG. 11, an area 1110 may be displayed on a screen while being inactivated and an area 1120 may be displayed on a screen while being activated. A bottom sheet displayed in the area 1120 may show a notification message that requests an additional address or detailed explanation to be input. The user may input the additional address or detailed explanation according to the notification message displayed in the bottom sheet, or may not input the additional address or detailed explanation despite the notification message displayed in the bottom sheet.

Figure 12A:
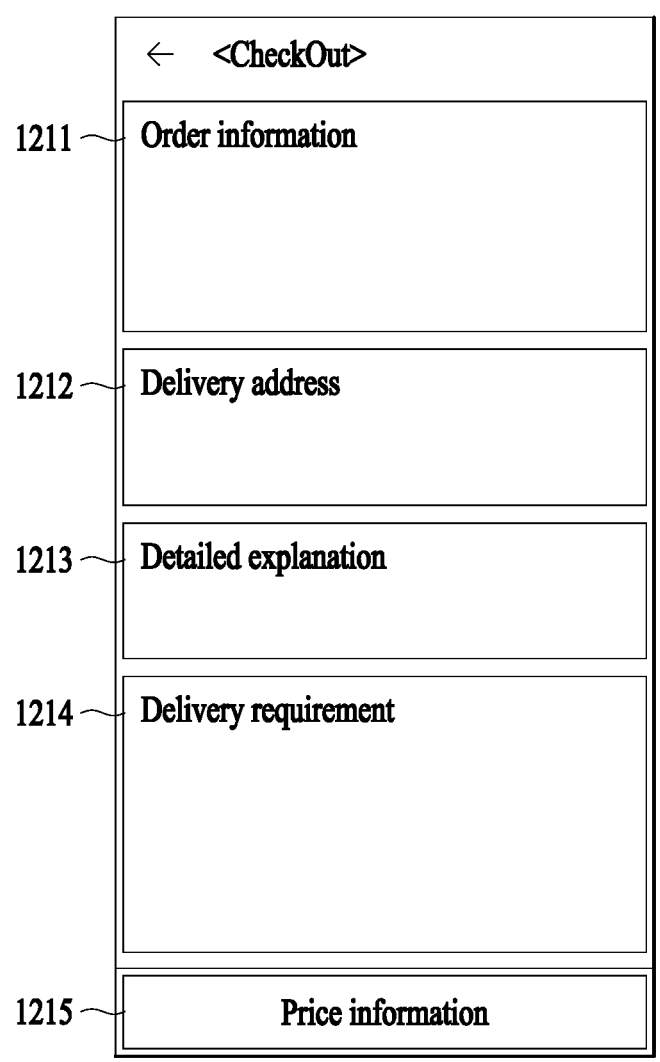
FIG. 12A is a diagram illustrating a screen displayed in a checkout stage in relation to a delivery service according to an example embodiment.
Figure 12B:
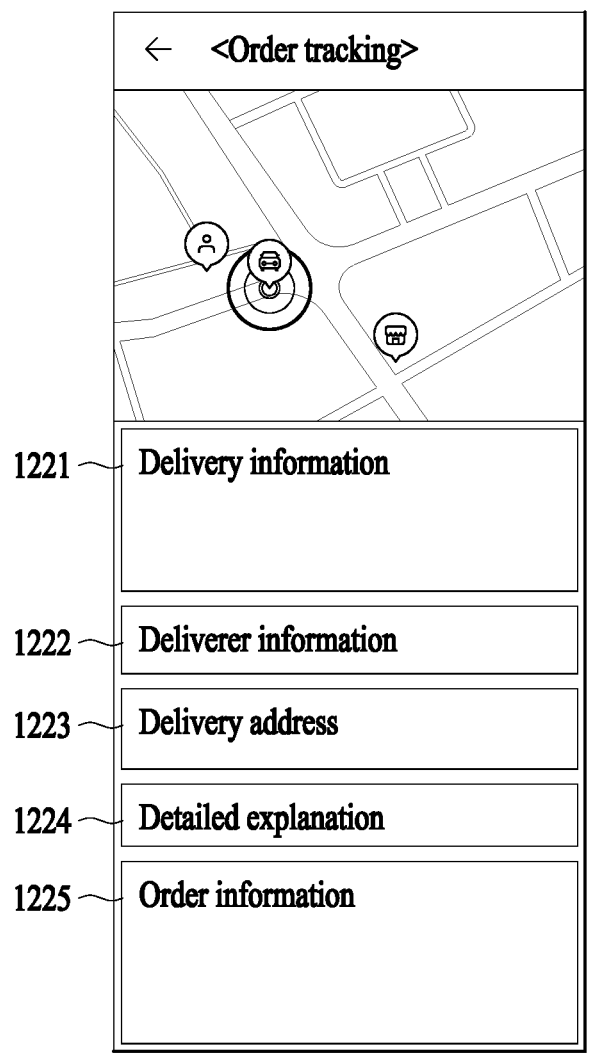
FIG. 12B is a diagram illustrating a screen displayed in an order tracking stage in relation to the delivery service according to an example embodiment.
Figure 12C:
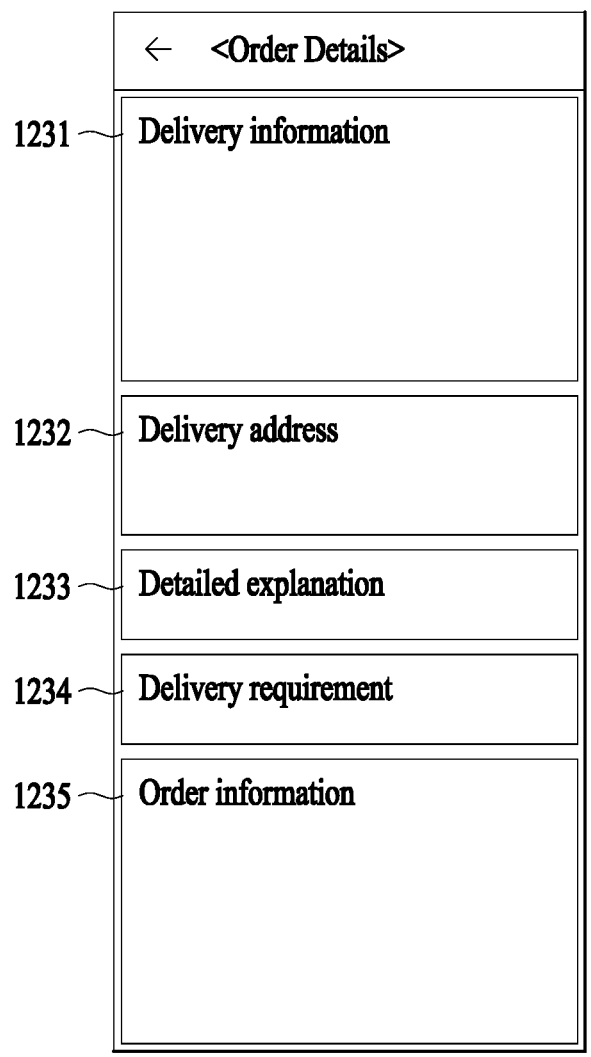
FIG. 12C is a diagram illustrating a screen displayed in an order details stage according to an example embodiment.

FIG. 12A is a diagram illustrating a screen displayed in a checkout stage in relation to a delivery service according to an example embodiment, FIG. 12B is a diagram illustrating a screen displayed in an order tracking stage in relation to the delivery service according to an example embodiment, and FIG. 12C is a diagram illustrating a screen displayed in an order details stage according to an example embodiment.

Referring to FIG. 12A, a user may identify order information 1211, a delivery address 1212, a delivery requirement 1214, and price information 1215 through a screen in a checkout stage. Here, the order information 1211 may include information (for example, a type, a quantity, a price, etc.) on an item ordered by a user. In addition, the delivery address 1212 may be information on an address to which an order is to be delivered, and may include information on the additional address and the search result described with reference to FIGS. 10 and 11 above. The delivery requirement 1214 may include information on requirements of the user for delivery, such as "leave it at the front door." The price information 1215 may include information on a total price of ordered items. Also, the user may additionally identify detailed explanation 1213 about the delivery address 1212 through the screen. For the detailed explanation 1213, a reference can be made with FIGS. 10 and 11.

Referring to FIG. 12B, the user may identify a map marking a position of a deliverer for tracking, delivery information 1221, deliverer information 1222, a delivery address 1223, and order information 1225 through a screen in an order-tracking stage. Here, the delivery information 1221 may include information on a time required for delivery, information on a delivery proceeding stage, and visual information corresponding to each proceeding stage. In addition, the deliverer information 1222 may include information on transportation used by a deliverer and information to be used by the user to contact the deliverer. The delivery address 1223 may be information on an address to which an order is to be delivered, and may include information on the additional address and the search result described with reference to FIGS. 10 and 11 above. The order information 1225 may include information on an item ordered by the user. Also, the user may additionally identify detailed explanation 1224 about the delivery address 1223 through the screen. For the detailed explanation 1224, a reference can be made with FIGS. 10 and 11.

Referring to FIG. 12C, the user may identify detailed information on an order through a screen in an order details stage. Specifically, the user may identify delivery information 1231, a delivery address 1232, a delivery requirement 1234, and order information 1235. Here, the delivery information 1231 may include, for example, information on a time required for delivery, information on a delivery proceeding stage, and visual information corresponding to each proceeding stage. In addition, the delivery address 1232 may be information on an address to which an order is to be delivered, and may include information on the additional address and the search result described with reference to FIGS. 10 and 11 above. The delivery requirement 1234 may include information on requirements of the user for delivery, such as "leave it at the front door." The order information 1235 may include information on an item ordered by the user. Also, the user may additionally identify detailed explanation 1233 about the delivery address 1232 through the screen. For the detailed explanation 1233, a reference can be made with FIGS. 10 and 11.

Figure 13A:
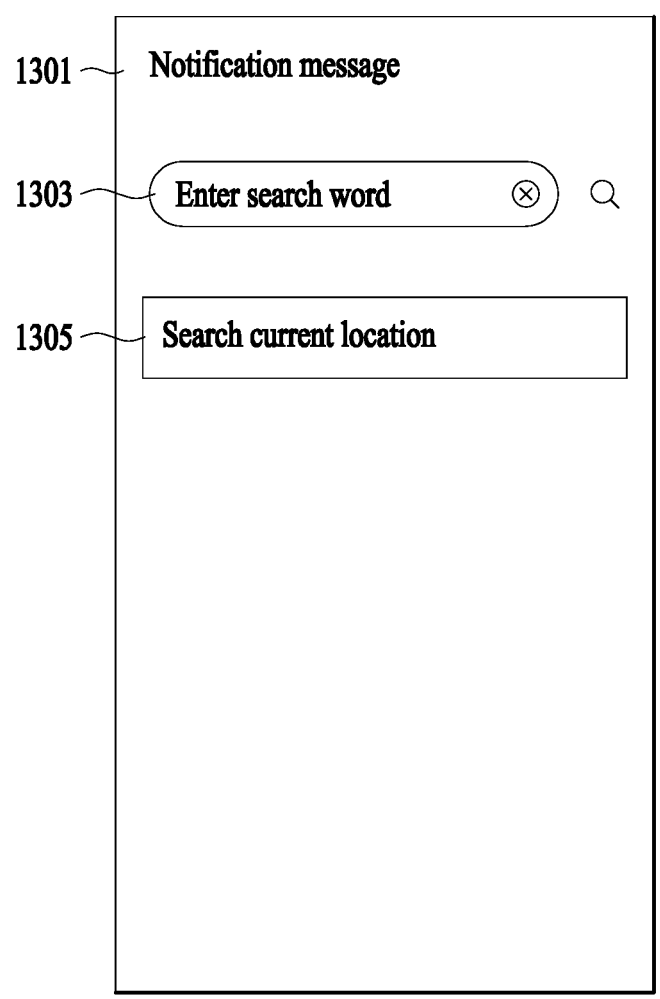
FIGS. 13A and 13B are diagrams illustrating a process of using a current location of a terminal as a delivery address according to an example embodiment.
Figure 13B:
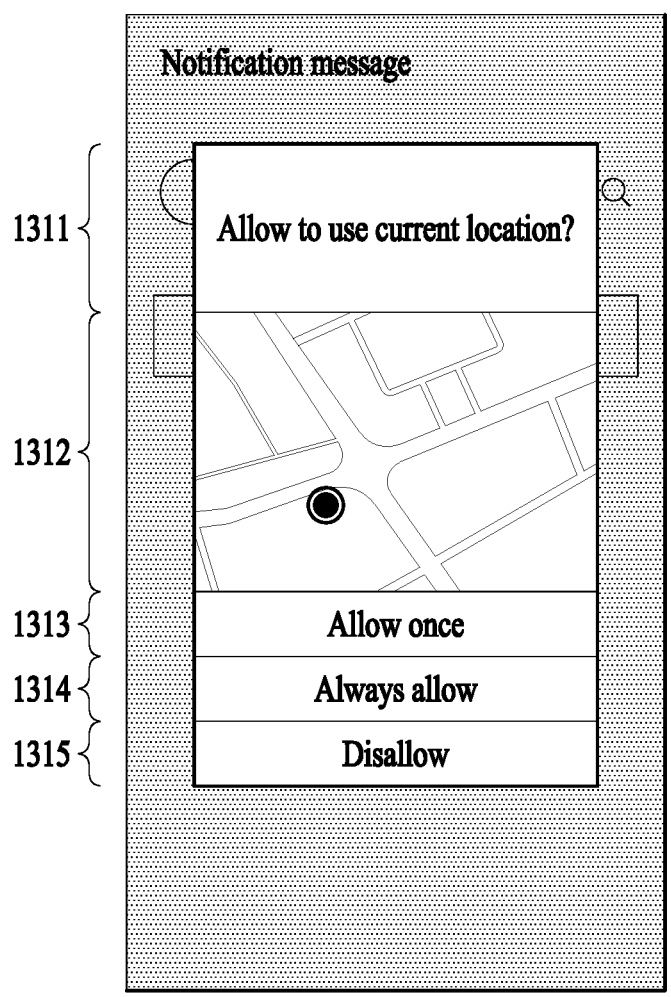

FIGS. 13A and 13B are diagrams illustrating a process of using a current location of a terminal as a delivery address according to an example embodiment.

Referring to FIG. 13A, a notification message 1301 associated with delivery may be displayed on a screen. For example, when a user uses an application for the first time, a notification message indicating "set address for order" may be displayed on the screen. In addition, any notification message required in relation to delivery may be displayed.

The user may input a search word in a field 1303. Specifically, according to the notification message, the user may enter an address (for example, zip code and the Road Name Address System) for setting a delivery address as the search word.

When the user is to request a delivery to a current location, the delivery may be requested by inputting a delivery address through the field 1303, and may also be requested by selecting a current location search icon as shown in an area 1305.

When the user selects a current location icon, a screen may be displayed as illustrated in FIG. 13B. This is because position information of a terminal used by the user is used, which is personal information that requires an approval of the user.

Referring to FIG. 13B, on the screen of FIG. 13A, a screen including information requesting the approval of the user required in relation to the current location search may be displayed with being activated. In an area 1311, a notification message "Allow to use current location?" required for the current location search may be displayed. In an area 1312, information on a map corresponding to the retrieved current location may be displayed. In areas 1313, 1314, and 1315, information associated with the approval of the user may be displayed. For example, in a case on "allow once", the approval may be effective at this time only, and the approval of the user may be required next time the current location is to be used. In a case of "always allow", the approval of the user may not be required the next time. In a case of "disallow", the current location of the user may not be used.

The electronic apparatus or terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method of operating an electronic apparatus, the method comprising:
    generating a first user interface comprising a first area for display by the electronic apparatus;
    receiving, from a user requesting a delivery service and via the first area, address information having multiple address levels;
    generating, based on the address information, a second user interface comprising a map with first position information associated with the address information and a region within a predetermined distance from the first position information, wherein the predetermined distance is based on one of the multiple address levels;
    receiving, from the user and via touch input on the map, second position information geographically spaced from the first position information;
    associating, based on the received touch input from the user identifying the second position and the second position being within the predetermined distance from the first position information, the received second position information with the address information by matching the address information and the second position information on the map; and
    transmitting, based on the second position being within the predetermined distance from the first position information, the address information and the associated second position information.

2. The method of claim 1,
    wherein the second position information is within corresponds to a position corrected in an area determined according to the predetermined distance and centered around the first position information on the map,
    wherein the predetermined distance is determined based on a predetermined category level, and
    wherein a size of the map on the display is based on an address corresponding to a lowest level of the predetermined category level.

3. The method of claim 1, wherein receiving the second position information is limited to only locations within the predetermined distance from the first position information on the map.

4. The method of claim 3, wherein the input address information is parsed based on a predetermined category level in association with an address.

5. The method of claim 3, wherein the predetermined distance corresponds to a distance set in advance based on a predetermined category level corresponding to the input address information.

6. The method of claim 5, wherein the predetermined distance is set to increase in response to the predetermined category level increasing and set to decrease in response to the predetermined category level decreasing.

7. The method of claim 1, wherein the transmitting of the address information and the associated second position information comprises:
    providing the address information and the associated second position information to a deliverer terminal.

8. The method of claim 7, wherein the transmitting further comprises:
    providing to the deliverer terminal and based on the address information and the second position information navigation information together with the address information and the second position information.

9. The method of claim 8, wherein the providing navigation information comprises:
    providing, to the deliverer terminal, image information corresponding to the second position information.

10. The method of claim 4, further comprising:
    parsing, based on the predetermined category level, the address information; and
    displaying a screen for requesting detailed information associated with the parsed address information.

11. The method of claim 3, wherein the second position information is prevented from being corrected to a position farther than the predetermined distance from the first position information on the map.

12. The method of claim 3, wherein the predetermined distance represents a maximum distance, on the map, from the first position information to locations selectable, by the user, as the second position information.

13. The method of claim 1, wherein the first position information is identified in response to a text-based input for an address, and
    the second position information is corrected in response to a touch input of the user on the map on which the first position information is displayed.

14. A non-transitory computer-readable recording medium comprising a computer program for performing the method of claim 1.

15. An electronic apparatus comprising:
    a memory storing instructions;
    a communication device; and
    a processor, when executing the instructions, configured to:
        display first position information on a map based on address information input by a user requesting a delivery service,
        determine a maximum distance from the first position information,
        receive, based on the displayed map and user interaction with the displayed map, second position information from the user;
        determine whether the second position information is less than the maximum distance from the first position information; and
        associate, based on a determination that the second position information is less than the maximum distance from the first position, the second position information with the address information by matching the address information and the second position information on the map.

16. A method of operating an electronic apparatus, the method comprising:
- generating a first user interface comprising a first area for display by the electronic apparatus;
- receiving, from a user requesting a delivery service and via the first area, address information of multiple address levels;
- generating, based on the address information, a second user interface comprising a map with first position information associated with the address information, wherein a scale of the map is based on a specific address level of the multiple address levels;
- receiving, from the user and via touch input on the map, second position information geographically spaced from the first position information, wherein the second position information is spaced no more than a maximum distance from the first position information, and wherein the maximum distance is based on the specific address level of the multiple address levels;
- associating the received second position information, within the maximum distance from the first position information, with the address information by matching the address information and the second position information on the map; and
- transmitting, based on the associated received second position information being less than the maximum distance from the first position, the address information and the associated second position information.

* * * * *